Nov. 25, 1969  F. A. GONZALEZ  3,480,015
APPARATUS FOR COLLECTING AND COOLING BLOOD
Filed May 12, 1967  4 Sheets-Sheet 1

INVENTOR
FRANK A. GONZALEZ
BY
Leo C. Krazinski
ATTORNEY

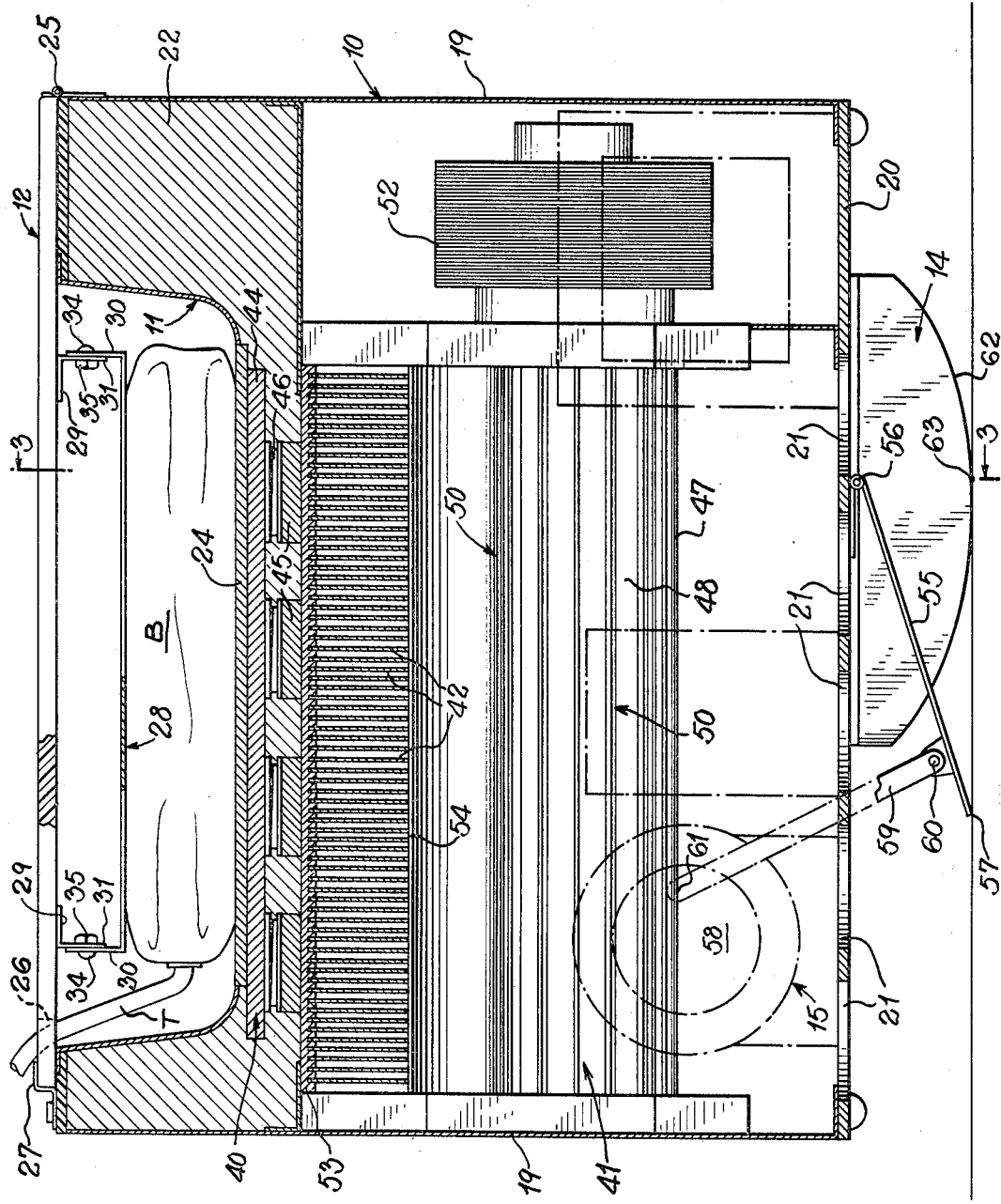

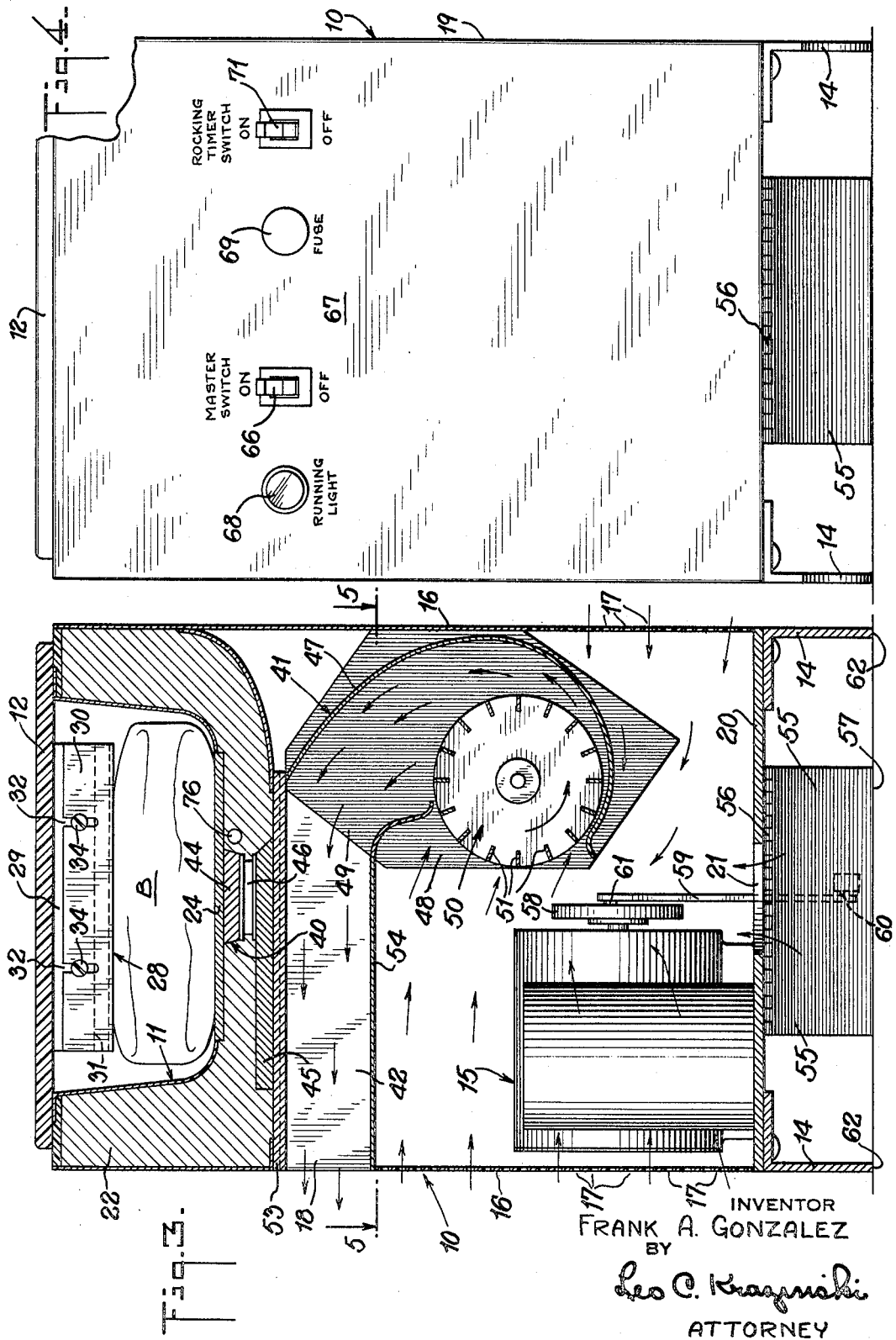

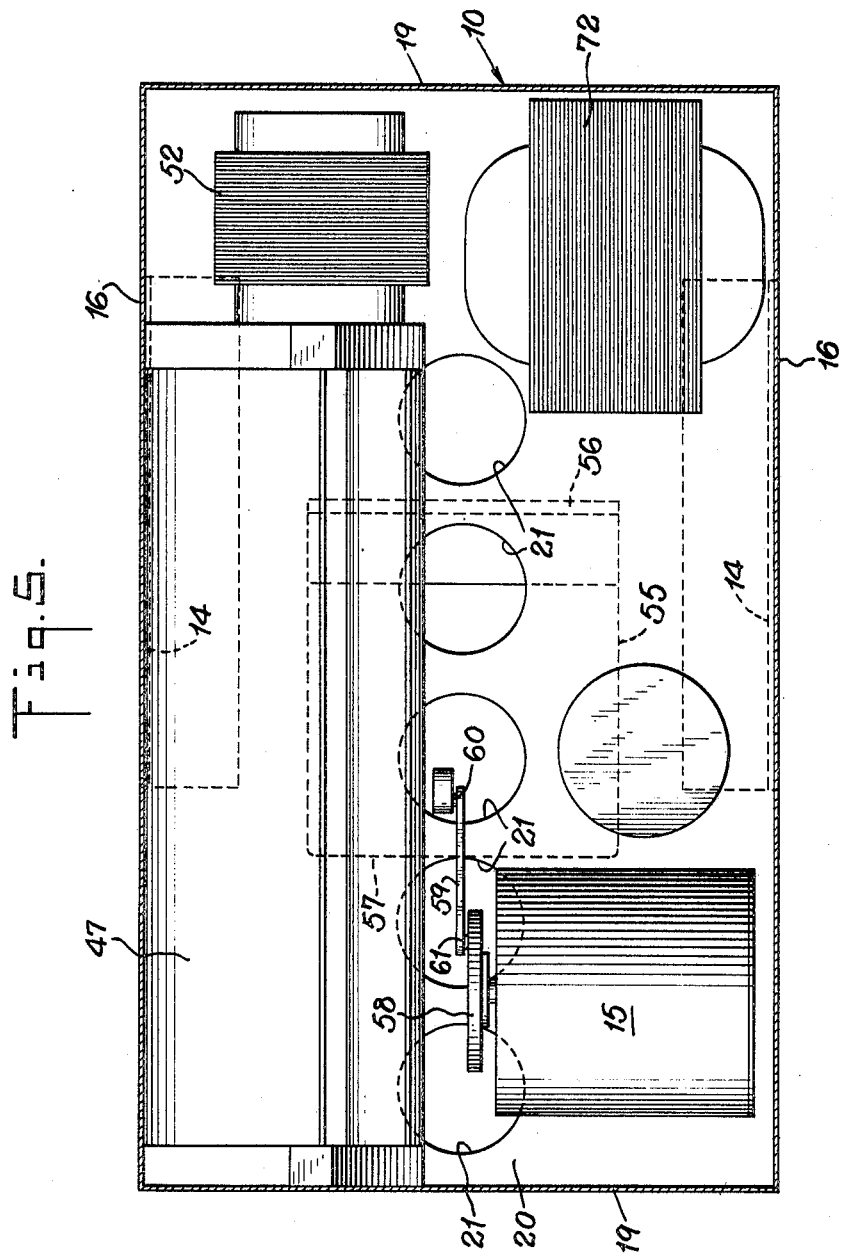

United States Patent Office 3,480,015
Patented Nov. 25, 1969

3,480,015
APPARATUS FOR COLLECTING AND COOLING BLOOD
Frank A. Gonzalez, New York, N.Y., assignor to Medical Electroscience, Inc., New Hyde Park, N.Y., a corporation of New York
Filed May 12, 1967, Ser. No. 638,142
Int. Cl. A61m 1/03; A61f 7/00
U.S. Cl. 128—276                8 Claims

ABSTRACT OF THE DISCLOSURE

Apparatus for collecting and cooling blood in a flexible bag placed in a pan within a box. The box contains a system for directly refrigerating the pan by extracting heat therefrom. The box has rockers formed with a compound curve surface to enable the box to be rocked by a motor driven mechanism to gently agitate the blood collected in the bag.

BACKGROUND OF THE INVENTION

Field of the invention

The present invention relates to surgery and, more particularly, to improved apparatus for collecting and cooling blood.

Description of prior art

Heretofore, as disclosed in United States Patent No. 2,845,929, Aug. 5, 1958, it has been proposed to collect blood in a flexible bag disposed within a sealed receptacle containing water, which was cooled by an external refrigerating system and in which blood was withdrawn from a donor into the bag under a vacuum system. Mechanism principally located exteriorly of the receptacle was provided for directly moving the bag within the cooled water.

The foregoing arrangement has a number of disadvantages. The refrigerating system is unduly complicated and bulky, so that it is not portable; consequently, it cannot readily be located adjacent a blood donor. Further, a conventional bag could not be used and, since the blood is drawn from the donor under a vacuum system, collapse of the donor's vein was a distinct possibility.

SUMMARY OF THE INVENTION

Accordingly, an object of the present invention is to provide improved apparatus for collecting and cooling blood which is not subject to the foregoing disadvantages.

Another object is to provide such apparatus which is compact and which is contained within a portable box as a unit.

Another object is to provide such apparatus which is more sophisticated in that it is a dry system, it automatically controls the cooling temperature, the volume of blood collected, and the rocking time.

A further object is to accomplish the foregoing objects in a simple, practical and economical manner.

Other and further objects will be obvious upon an understanding of the illustrative embodiment about to be described, or will be indicated in the appended claims and various advantages not referred to herein will occur to one skilled in the art upon employment of the invention in practice.

In accordance with the present invention, the foregoing objects are generally accomplished by providing apparatus which comprises a box, a heat conductive pan in the upper portion of the box for receiving a blood collecting bag, a cover for the pan on the box, refrigerating means enclosed in the box in heat conductive connection with the underside of the pan, means at the bottom of the box for mounting the box for rocking movement, and motor driven means for rocking the box, whereby blood in the bag is gently agitated.

BRIEF DESCRIPTION OF THE DRAWINGS

A preferred embodiment of the invention has been chosen for purposes of illustration and description and is shown in the accompanying drawings, forming a part of the specification, wherein:

FIG. 2 is a sectional view taken along the line 2—2 on FIG. 1.

FIG. 3 is a sectional view taken along the line 3—3 on FIG. 2.

FIG. 4 is an end elevational view illustrating a control panel.

FIG. 5 is a sectional view taken along the line 5—5 on FIG. 3.

DESCRIPTION OF THE PREFERRED EMBODIMENT

Figure 1:
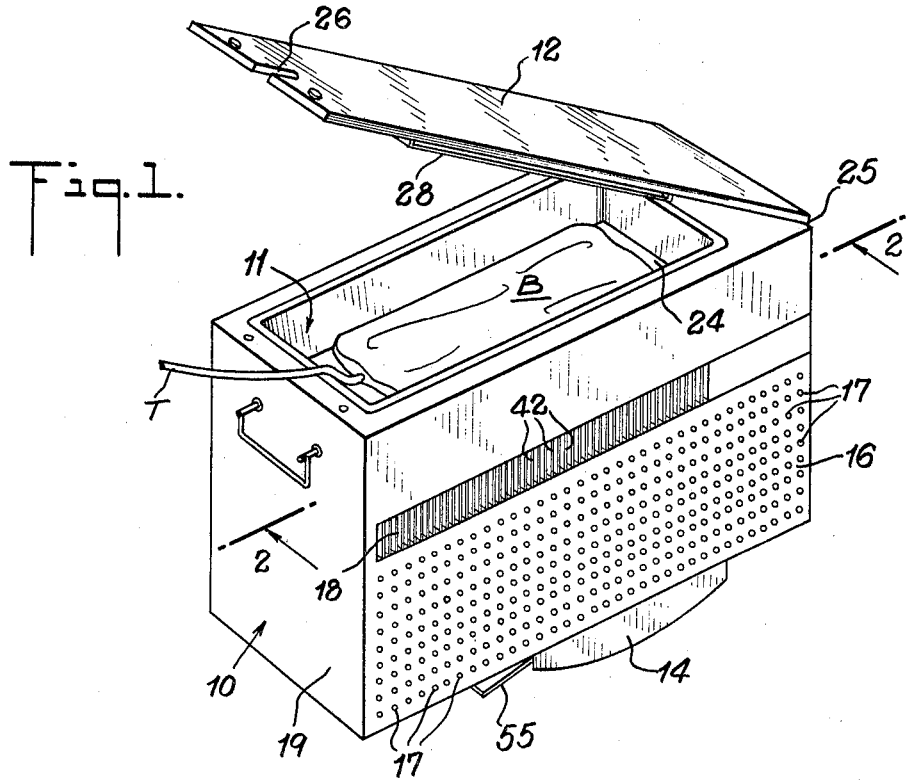
FIG. 1 is a perspective view of apparatus in accordance with the present invention.

Referring now to FIGS. 1 to 5 of the drawings in detail, there is shown apparatus which generally comprises a box 10, a heat conductive pan 11 in the upper portion of the box for receiving a conventional sterile, plastic blood collecting bag B, FIGS. 2 and 3, provided with a plastic tube T having one end connected to the inlet of the bag and having its other end connected to a needle (not shown) which is inserted into the vein of a blood donor, a cover 12 for the pan 11 on the box 10, a refrigerating system in the box, rocker members 14 on the underside of the box, and a torque motor 15 in the box provided with linkage for effecting rocking motion of the box.

The box 10 preferably is oblong, and has side walls 16 both of which are provided with air inlet openings 17, with one side wall being provided with an elongate air outlet slot 18, end walls 19, and a bottom wall 20 having air inlet openings 21.

The pan 11 is embedded in heat insulating material 22 confined within the box 10, and has a highly heat conducting bottom 24 for supporting the bag B.

The bag B is in its collapsed state when placed on the bottom 24 of the pan and contains a blood anti-coagulant. A fluid wetting agent may be added between the bag and pan to increase conductivity therebetween.

The cover 12 has one of its sides hinged to the upper side of the box 10 at 25, and has a recess 26 at its other side in which the tube T fits snugly to seal the recess. The cover is held in closed position by suitable means 27 at the end in which the recess 26 is formed.

In order to predetermine the amount of blood to be collected in the bag B, a pressure plate 28, formed with a downwardly facing surface is mounted on angle members 29 attached to the underside of the cover 12, which surface is engaged by the bag when a desired amount of blood has been collected therein. The pressure plate 28 thus stops expansion of the bag to prevent further flow of blood into the bag. The pressure plate 28 and cover 12 are preferably made of transparent plastic material, such as Plexiglas, in order to be able to view the bag B. The ends of the plate 28 and the angle members 29 have vertical portions 30 and 31, respectively, each formed with a vertical slot 32 for receiving a screw 34 having a nut 35 threaded thereon for securing the portions 30 and 31, so that the plate surface can be adjusted to be engaged by the bag at desired levels to control the amount of blood collected by the bag.

The refrigerating system includes thermoelectric heat exchange means 40, an air blower 41 in the box, and heat dissipating fins 42 in heat conducting connection with the heat exchange means 40 and positioned in the path of the air circulated by the blower 41.

The thermoelectric heat exchange means 40 are units of the type obtainable from Melcor Materials Electronic Products Corporation, Trenton, N.J., which comprise an upper cold plate 44 and a lower hot plate 45 having sandwiched therebetween a low current operable ceramic insulated thermoelectric module 46 composed of a plurality of thermocouples. Such units have an operating temperature range from minus 20° F. to plus 220° F.

The units shown in FIGS. 2 and 3 comprise a lengthwise extending cold plate 44 in heat conductive connection with the bottom 24 of the pan 11 and a plurality of crosswise extending hot plates 45. The units are embedded in the insulation 22.

The air blower 41 comprises a casing 47 having an inlet 48 for receiving air entering the box 10 by way of the openings 17 and 21 and having an outlet 49 facing the air outlet slot 18 of the box, an impeller 50 in the casing having radial blades 51 thereon, and a motor 52 for rotating the impeller 50. The inlet 48, the outlet 49 and the impeller 50 are co-extensive with the slot 18 which is approximately co-extensive with the length of the pan 11.

The fins 42 are secured to and depend from a heat conductive plate 53 which is in heat conductive connection with the hot plates 45. The fins extend crosswise within the box 10 from the blower outlet 49 to the outlet slot 18 (FIG. 3), and are arranged in parallel, spaced relationship from one end of the slot to the other end (FIG. 2). A wall member 54 at the lower edge of the fins 42 extends from the blower outlet 49 to the outlet slot 18 to provide a passageway for confining air flow among the fins 42.

The box rocking arrangement is best shown in FIGS. 2 and 3 and comprises the rocker members 14 secured to the bottom wall 20 of the box 10 in line with the side walls 16, a plate-like lever 55 between the rocker members 14 having one end pivotally connected to the bottom of the box at 56 and having its other end 57 positioned for engaging the surface which supports the rocker members, an eccentric 58 on the drive shaft of the motor 15, and a rod 59 having one end connected to the lever 55 near its end 57 at 60 and having its other end connected to the eccentric 58 at 61.

The rocker members 14 extend lengthwise between the end walls 19 of the box 10, each having a curve which is designed to allow the torque motor 15 to operate with a minimum of energy output. To accomplish this the rocker members 14 have lower edges 62 in the shape of a compound curve provided with a balance point at 63 to give the box a smooth rocking motion which effects complete mixing of the blood and anti-coagulant within the bag B, so that the anti-coagulant is dispersed in the blood and the blood is cooled rapidly. The bag in conjunction with movement of the box 10 is moved horizontally about 3.5 inches and is moved vertically about 1.5 inches about thirty times a minutes to cause the blood and anti-coagulant to strongly surge back and forth.

Figure 6:
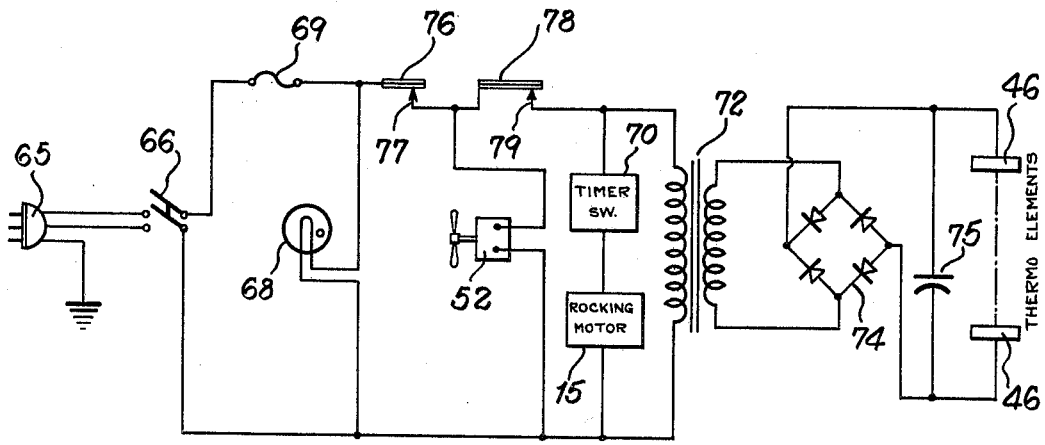
FIG. 6 illustrates a diagram of an electrical control circuit for the apparatus.

The electrical control circuit, shown in FIG. 6, comprises a source of A.C. power 65, a master switch 66, mounted on a control panel 67 (FIG. 4), for turning the apparatus "on" and "off," a lamp 68 mounted on the panel 67 and connected across the power line to give an indication that the master switch is in its "on" position, a fuse 69 mounted on the control panel 67 for convenient replacement thereof and between the master switch 66 and the lamp 68, so that the lamp will go out when the fuse is blown, the air blower motor 52 connected across the power line, and the rocker motor 15 in series with a timing switch 70 across the power line and provided with an "on" and "off" toggle 71 on the panel 67.

A transformer 72 is connected across the power line, a full wave rectifier 74 has its input connected to the output of the transformer, the modules 46 of the thermoelectric units 40 are connected in series across the D.C. output of the rectifier, and a capacitor 75 is connected across the rectifier output to produce a low ripple factor in the D.C. output.

The cold plate 44 has a thermostat 76 which opens a switch 77 when the cold plate temperature is below 39° F. and closes the switch when the cold plate temperature is above 43° F. The hot plate 45 has a thermostat 78, which opens a siwtch 79 when the hot plate temperature is above 160° F. and closes the switch when the hot plate temperature is below 125° F. The switches 77 and 79 are connected in series in one side of the circuit between the lamp 68 and the rocker motor 15 in the order named. The blower motor 52 has one of its terminals connected between the switches 77 and 79, so that the blower will continue to operate on and off as the cold plate thermostat 76 opens and closes, respectively. The hot plate thermostat 78 is provided as a protection for the modules 46 in the event that the blower fails or malfunctions.

In operation, a standard, approved bag B with a prescribed amount of anti-coagulant and attached end of tube T are placed in the pan 11, the remainder of the tube T is extended through the slot 26 of the cover 12 and the cover 12 is secured to the box. It might be mentioned at this point that the bag B with tube T and needle are provided in a sealed, sterile container (not shown), one such bag B being a self-collapsing essentially air-free container for collection and preservation of 450 ml. (475 gm.) of citrated whole blood (human) and containing 67.5 ml. of anti-coagulant (A–C–D solution, U.S.P. and N.I.H. "Formula A").

The box 10 is placed on the floor adjacent the donor and, after the blood donor has been prepared and the tube needle (not shown) has been inserted into a vein, the master switch 66 and the timing switch 70 are turned on. The refrigerating system and the rocker are now in operation and simultaneously the blood flows under gravitational influence into the bag 10 until such blood flow is stopped by the plate 28 exerting pressure on the bag.

In view of the fact that it takes about five minutes to collect the desired quantity of blood and the donor rests for about five minutes after the needle has been withdrawn (during which time the next donor can be prepared), the timing switch is set for about ten minutes, so that cooling and agitation of the blood continues after collection has ceased. This allows the blood to be cooled gradually and evenly from 98.6° F. to about 40° F. over a period of time which will not cause damage to the blood by too rapid cooling thereof.

When the timing switch 70 opens, rocking ceases. The bag in which the blood has been collected is removed and is placed in cold storage. The apparatus now is ready to resume operation for receiving blood from the next donor.

From the foregoing description it will be seen that the present invention provides improved blood collecting and cooling apparatus which provides for thorough mixing of the anti-coagulant and the blood while the blood is being cooled evenly at a rate which is non-damaging to the blood but does not cause delay between donations.

What is claimed is:
1. Apparatus for collecting and cooling blood comprising a box, a pan with a blood collecting bag therein containing an anti-coagulant in said box, heat exchange means enclosed in said box for extracting heat from blood in said bag and for cooling said blood, means for rocking said box, whereby the blood and anti-coagulant in said bag are gently agitated, means for timing said rocking means, a cover for said pan on said box, said heat exchange means being in heat conductive connection with the underside of said pan, said rocking means being located at the bottom of said box, and motor driven means for actuating said rocking means.

2. Apparatus according to claim 1, wherein a plate is mounted on the underside of said cover having a downwardly facing surface engageable by the bag when a desired amount of blood has been collected therein to prevent further flow of blood into the bag.

3. Apparatus according to claim 2, wherein adjustable means support said plate, whereby said plate surface can be positioned to be engaged by the bag at desired levels.

4. Apparatus according to claim 1, wherein said cover has a recess at one edge thereof for receiving a blood collecting tube connected to the bag.

5. Apparatus according to claim 1, wherein said box has air inlet openings and has an elongate air outlet slot of a length about equal to the length of said pan; said heat exchange means includes thermoelectric means having a cold plate in heat conductive connection with the underside of said pan and having downwardly facing hot plates, said box having air inlet openings in the walls thereof and having an air outlet slot in one of its walls, an air blower in said box having an inlet for receiving air entering said inlet openings and having an air outlet of a width equal to the length of said slot, and a series of spaced apart, parallel fins in heat conductive connection with said hot plates and extending from said blower outlet to said air outlet slot.

6. Apparatus according to claim 1, wherein said rocking means includes rocker members secured to the bottom of said box having a compound curve surface.

7. Apparatus according to claim 6, wherein said motor driven box rocking means includes a motor in said box, an eccentric driven by said motor, a lever having one end pivotally connected to the bottom of said box and having its other end positioned for engaging a surface supporting said rocker members and a rod having one end connected to said other end of said lever and having its other end connected to said eccentric.

8. Apparatus according to claim 7, wherein said rocker members are at opposite sides of said box, and said lever is a plate positioned between rocker members.

References Cited

UNITED STATES PATENTS

| 2,845,929 | 8/1958 | Strumia | 128—276 |
| 2,982,286 | 5/1961 | Welch | 128—276 |
| 3,234,595 | 2/1966 | Weichselbaum | 62—3 X |
| 3,293,868 | 12/1966 | Gonzalez | 62—3 |

DALTON L. TRULUCK, Primary Examiner

U.S. Cl. X.R.

62—3; 128—275.1, 399